March 18, 1947.　　P. CROSLEY, 3D　　2,417,586
METHOD OF MAKING LAMINATED STRUCTURES
Filed April 25, 1944　　3 Sheets-Sheet 1
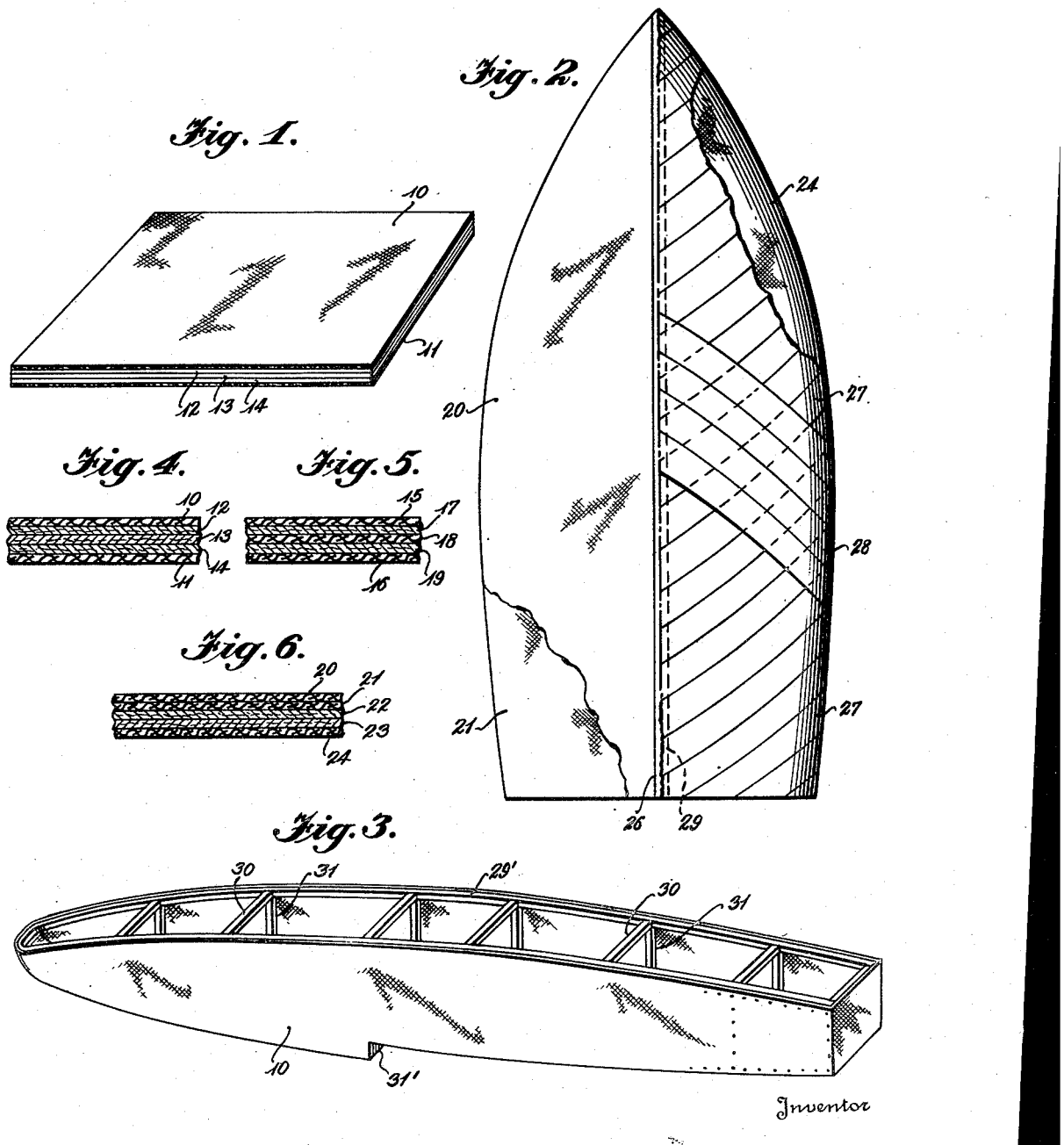
Inventor
Powel Crosley, III
By Bacon + Thomas
Attorneys March 18, 1947.    P. CROSLEY, 3D    2,417,586
METHOD OF MAKING LAMINATED STRUCTURES
Filed April 25, 1944    3 Sheets-Sheet 2

Inventor
Powel Crosley, III
By Bacon & Thomas
Attorneys

March 18, 1947. P. CROSLEY, 3D 2,417,586
METHOD OF MAKING LAMINATED STRUCTURES
Filed April 25, 1944 3 Sheets-Sheet 3

Inventor
Powel Crosley, III
By Bacon & Thomas
Attorneys

Patented Mar. 18, 1947

2,417,586

UNITED STATES PATENT OFFICE 2,417,586

METHOD OF MAKING LAMINATED STRUCTURES

Powel Crosley, III, Coral Gables, Fla.

Application April 25, 1944, Serial No. 532,668

6 Claims. (Cl. 154—139)

This invention relates to a method of making laminated structures and more particularly to a method of rapidly and easily producing waterproof laminated structures having high mechanical strength and suitable for covering or forming the surfaces of various structures such as boats, airplane wings or fuselages, pontoons, etc.

The method of the present invention produces an integrally bonded laminated structure of high mechanical strength which is capable of withstanding long exposure to weather or submergence in water and which can be made in substantially any desired shape so as to conform to curved surfaces. In the finished structure the various laminae are substantially completely impregnated and bonded together with a waterproof synthetic resin so that the finished structure is substantially integral and takes on the character of a molded plastic heretofore requiring curing and forming by means of both heat and pressure.

In accordance with the present invention the laminated structure is built up in a plurality of layers at least certain of which are of a woven fabric and others of which may be of non-woven fibrous material such as wood veneer, or felted fibrous material including paper-like material such as cardboard. At least the layers of non-woven fibrous material and preferably the layers of woven fabric are advantageously applied while saturated with a soluble synthetic resin which can be cured or set to an insoluble and infusible state. The resulting structures are cured without external pressure, an internal pressure being built up by stretching an outer layer of woven fabric and taking advantage of shrinkage of this outer layer during curing. The laminated structure may be made integral with a bracing structure, for example the spars and ribs of an airplane wing or the internal structure of an airplane fuselage or portions thereof, or may be fabricated over a mold, for example in the case of small boats or portions of an airplane fuselage, and all or certain of the internal bracing structure of the boat or other structure incorporated into the same after the laminated structure has been removed from the mold.

It is, therefore, an object of the present invention to provide an improved process of forming laminated structures impregnated and bonded with an insoluble and infusible synthetic resin.

Another object of the invention is to provide an improved process of producing laminated structures of high mechanical strength and in substantially any desired shape without the employment of external pressure.

Another object of the invention is to provide an improved process of producing weatherproof and waterproof laminated structure saturated and bonded together with a synthetic resin which sets or cures to an insoluble and infusible state.

A further object of the invention is to provide a process of making laminated structures of substantially any desired conformation in which lamina of dissimilar materials are impregnated and bonded together with a curable synthetic resin without the aid of external pressure during the curing operation.

A still further object of the invention is to provide a process of making laminated structures having high mechanical strength and resistance to weathering in which layers of woven fabric are integrally bonded with layers of non-woven fibrous material all of which are saturated and bonded together by a soluble synthetic resin which sets to an insoluble state.

Other objects and advantages of the invention will appear in the following description of preferred embodiments of the invention made in connection with the attached drawing, of which:

Fig. 1 is an isometric view of a laminated structure in accordance with the present invention;

Fig. 2 is a bottom view of a small boat illustrating various stages in the construction thereof;

Fig. 3 is an isometric view of an airplane pontoon with the top covering omitted;

Fig. 4 is a fragmentary sectional view on a large scale of a laminated structure in accordance with the present invention;

Fig. 5 is a view similar to Fig. 4 of a modified structure;

Fig. 6 is a view similar to Fig. 4 of a further modified structure.

Figure 7:
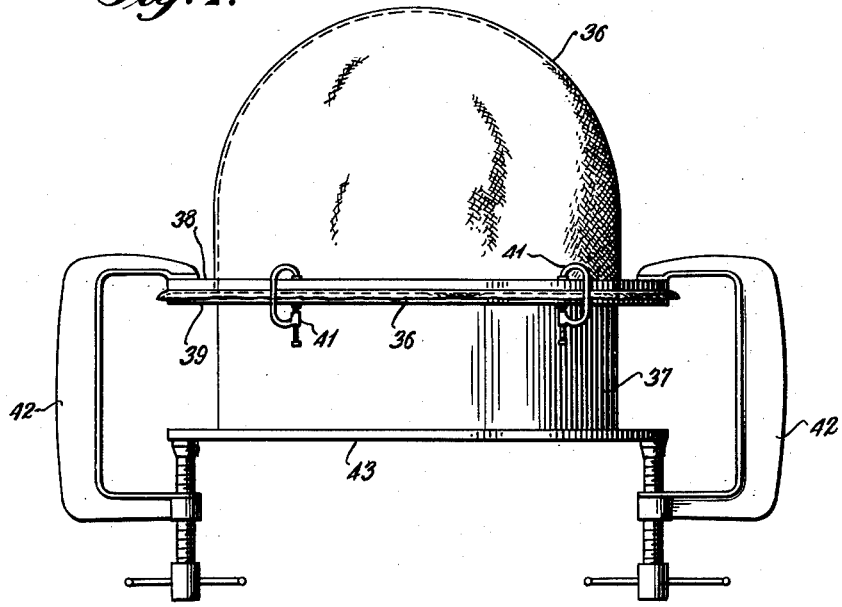
Fig. 7 is a side elevation of apparatus useful in carrying out the present invention.

Referring to Fig. 1, an example of a laminated structure produced by the present invention may include surface layers 10 and 11 of woven fabric and a plurality of intermediate layers 12, 13 and 14 of non-woven fibrous material such as wood veneer cardboard or fiber board. A section of the structure of Fig. 1 is shown on an enlarged scale in Fig. 4. The exact arrangement of lamina shown in Figs. 1 and 4 may be varied for different purposes, for example in Fig. 5, the structure may include surface fabric layers 15 and 16, an intermediate layer 17 of non-woven fibrous material, a central layer 18 of woven fabric and another intermediate layer 19 of non-woven fibrous material. As another example the structure may include two woven fabric layers 20 and 21 at one surface of the structure, two intermediate non-woven fibrous layers 22 and 23 and another surface layer 24 of woven fabric.

Figs. 4, 5 and 6 merely constitute examples of the various structures which may be provided in accordance with the present invention and any desired number and arrangement of layers may be employed. In general the woven fabric may be a cotton cloth such as muslin ranging from relatively light material to closely woven heavy material such as canvas, depending upon the strength desired. Other fabrics such as linen or rayon or even more expensive fabrics may be employed if desired and in some cases fabric made up of glass fibers can be advantageously employed. The non-woven fibrous material may be any absorptive compact fibrous material, such as wood veneer, or paper board or the like. For example fibrous structures felted and compacted in any suitable manner known to the paper making art from substantially any type of wood or other pulp and being sufficiently free of fillers or size to be absorbent of aqueous solution can be employed. In general, the woven fabrics impart tensile strength and flexibility to the structure while the non-woven fibrous material imparts stiffness or rigidity to the structure. The thickness of the strips of non-woven fibrous material will vary with the nature of the material forming the strips and the nature of the article being fabricated. For example, strips ranging in thickness between approximately 0.025 and 0.125 inch may be employed for various articles.

It is preferred to provide outer layers of woven fabric in conjunction with inner layers of non-woven fibrous material between which one or more layers of woven fabric may be positioned. For most constructions all of the various laminae are thoroughly saturated with a solution of a soluble synthetic resin of the type above described during fabrication and the various layers are applied while wet. For some structures, particularly boats, the outer lamina forming the outer surface of the boat, such as the lamina 20 of Fig. 6, may be of relatively closely woven fabric, for example canvas, applied to the other laminae as the last layer and saturated with a suitable deck adhesive. Such deck adhesives, many of which are known in the art, may be a deck paint or spar varnish. Suitable deck adhesives are of the type which do not harden into a brittle substance but retain their flexibility, thus imparting substantial flexibility to the entire laminated structure and protecting the boat or other structure against abrasion and fracture by shock due to grounding or impact with other structures. Also suitable plasticizers known to the resin art can be employed in admixture with the resin binder to impart flexibility and reduce brittleness.

In constructing a boat, such as that shown in Fig. 2, a male mold (not shown) is usually employed. The details of such a mold are not important to the present invention but such molds may be made in sectional form, if desired, as will be understood by those skilled in the art so that various internal stiffening members such as keelson, gunwales, ribs, and transom may be supported in grooves in the mold or against the surface of the mold, for example in forming a square stern boat the transom may be positioned against the flat end surface of the mold. Alternatively the mold may have a smooth surface and the laminated boat hull may be formed directly upon the mold and any necessary internal or external strengthening or stiffening members applied to the hull after removal from the mold.

The first step in making a boat in accordance with the present invention is usually the streching of a fabric layer, such as the layer 24 of Fig. 6 or the layer 16 of Fig. 5, over the mold. If the mold is constructed to contain stiffening structure such as keelson, gunwales and transom, the fabric may be stapled or otherwise attached to such stiffening members. It will be apparent that the fabric may be cut into any desired shape so as to enable it to conform to the contour of the mold. This fabric may be applied either while saturated with the impregnating binder or may be saturated with the impregnating binder after being applied to the mold. In Fig 2 the left portion of the bottom of the boat is shown with a portion of the outer layer, for example the layer 20 of Fig. 6, removed to expose an underlying fabric layer, for example the layer 21 of Fig. 6. The keel is shown as being half broken away so as to expose, on the right portion of the bottom of the boat, strips 27 and 28 of non-woven fibrous material making up, for example the layers 22 and 23 of Fig. 6, and overlapping the keelson 29 indicated in dotted lines. The strips 27 are also shown as being partially broken away to expose the inner layer which may be the fabric 24 of Fig. 6.

After the fabric 24 has been applied to the mold and saturated with the solution of water-soluble synthetic resin, the strips of non-woven fibrous material 27 are then applied against the fabric 24. Desirably these strips run diagonally of the structure as shown in Fig. 2 and may be trimmed to the necessary shape so that the layer conforms to the shape of the hull. The strips are preferably applied while saturated or soaked with the resin solution, preferably by dipping the same into the resin solution. They may be stretched over the surface of the fabric 24 and secured thereto in any desired manner, for example by stapling with corrosion resistant staples. Another series of strips 28 may then be applied along an opposite diagonal as shown in Fig. 2. These strips may likewise be applied while wet with the resin solution and may be similarly attached to the boat structure. A fabric layer 21 may then be stretched over the layer of strips 22 and also secured to the structure of the boat in a manner similar to the layer of fabric 24 and strips 21 and 22. This layer of fabric is also saturated with the resin solution either before or after application. When wood veneer is employed for the non-woven fibrous material it is many times desirable to soak the strips in water to cause the wood fibers to expand, then apply the strips to the structure after dipping in the resin solution, or the strips may be applied to the structure while wetted with water and then coated with the resin solution.

An outer fabric layer 26, saturated with suitable deck adhesive, may then be applied although it is preferred to allow the hull to dry and the synthetic resin binder thereof to cure prior to applying the layer 26. It will be apparent that for light weight construction, such as canoes, etc., the outer layer 26 may be omitted. The hull is preferably allowed to remain on the mold until it has dried, in order to prevent warping. When fabricating a boat or other structures on a removable mold, the inner layer of fabric is preferably applied dry and then painted with the resin solution prior to applying the strips of non-woven fibrous material and the mold is preferably treated prior to use to prevent, as far as possible, sticking of the structure to the mold due to resin solution soaking through the inner layer. After drying and removal of the fabricated structure from the mold, it is preferably coated inside and outside with the resin solution and this coating allowed to dry prior to applying the outer fabric layer 26. As stated before, other internal and external stiffening members may be applied to the hull or other structure after it is removed from the mold and these may be applied during drying and curing of the final coating or after drying and curing. The same method of construction may be employed for other structures than boats, for example airplane fuselages, automobile bodies, etc.

For structures having an internal frame provided with relatively closely spaced stiffening members such as spars, ribs, etc., the frame itself may serve as the mold. For example the airplane pontoon of Fig. 3 may be fabricated by first building a frame, such as one including longitudinal members 29', cross members 30, and vertical members 31. It is understood that suitable frame members (not shown) form the bottom of the pontoon, as well as the step 31'. After the frame has been constructed a fabric layer, such as layer 10 of Fig. 4, may be stretched over the frame and suitably secured thereto as by staples, tacks or screws. This layer is preferably applied while wet with the resin solution, but may be saturated with resin solution after being applied to the frame. Strips of non-woven fibrous material soaked in the resin solution are then applied and fastened to the frame in a manner similar to that described with reference to Fig. 2. It will be apparent that with relatively large flat surfaces, or surfaces having simple curvature, relatively large sections of the non-woven fibrous material may be applied at one time instead of employing strips, but in general it has been found more advantageous to apply the non-woven fibrous material in strip form as a more uniform structure can usually be secured.

After a suitable number of layers of strips of fibrous material, such as the layers 12, 13 and 14 of Fig. 4, have been applied with the strips preferably running in crossing relation, another layer of fabric, such as the layer 11 of Fig. 4, may be applied preferably while wet with the resin solution or applied dry and then saturated with the solution, for example by brushing or spraying. By suitably stretching the various laminae during application, a relatively dense structure can be built up and no external pressure is necessary. It will be understood that a similar laminated structure can be applied to the top of the pontoon shown in Fig. 3 and that the fabric as well as the strips may extend continuously over several or all of the surfaces of the pontoon thus making a substantially integral structure.

The saturant and binder employed in the present invention may be any one of several resins. Thus partially reacted urea aldehyde resins or partially reacted phenol aldehyde resins including cresol aldehyde resins are contemplated. For most purposes it is preferred to employ resins which are water soluble in their partially reacted state, for example, the urea formaldehyde resins. This enables water solutions of the resin to be used as the saturant for the various lamina in order to take advantage of the shrinking effect of water upon woven fabrics and also to avoid the use of expensive volatile organic solvents. It is to be understood, however, that partially reacted synthetic resins in solutions of organic solvents may be employed. The synthetic resins contemplated are of the type which further react to form substantially insoluble and infusible compounds. A preferred resin is a partially reacted water soluble urea formaldehyde resin employed in conjunction with an acid liberating material which causes the resin to further react or polymerize at relatively low temperatures to its infusible and insoluble state, i. e. resins of the cold setting type. However, it is within the contemplation of the present invention to employ elevated temperatures to accelerate the setting or curing of the cold setting types of resin or to employ elevated temperatures with thermo setting synthetic resins. All of the types of resins thus described are known to the art and available on the market and are employed in the present invention either in water or organic solvent solutions in concentrations usually ranging between approximately 5 and 15% although the concentration will vary depending upon the type of resin, the type of fabric of other fibrous material employed, and the strength desired in a given structure.

By employing such resins as binders or adhesives and applying the layers of fibrous material while soaked with an aqueous solution of the binder or thoroughly impregnating them with the binder solution after being placed in position, the structures of the present invention provide a substantially continuous binder structure forming a continuous phase extending throughout the thickness of the laminated structure and binding the various laminae into an integral structure. The cold setting resins dry and set into such an integral structure at ordinary atmospheric temperatures although the drying and setting can be speeded up by employing slightly elevated temperatures, for example 150° to 175° F., without injuring the properties of the binder, but dense coherent laminated structures are easily produced without the employment of any external pressure. The thermo setting resins usually require somewhat more elevated temperatures, for example 200 to 400° F. and are also cured without application of external pressure. The resulting laminated structure will withstand weathering or contact with water for extended periods of time, it has high mechanical strength and can be depended upon for developing a major portion of the structural strength of boats, airplane wings, pontoons, etc. Such laminated structures also have substantial resistance to shock due to impact with other objects. A major advantage of employing woven fabric as a lamina, particularly an outer lamina, is that the cloth shrinks and the resin therein sets up at a faster rate than in the dampened layers of veneer, cardboard or like material. This applies pressure to hold the strips together and consolidates the structure even though no external pressure is employed.

It will be apparent from the above description of the invention that one of the major factors resulting in the success of the present invention is the stretching of the woven fabric lamina, particularly the outer lamina so as to set up internal pressure in the laminated article during curing of the synthetic resin. This stretching is particularly effective on convex surfaces and the stretching in conjunction with shrinking of the fabric during drying and curing of the resin sets up an internal compressive stress on the inner lamina which obviates the necessity of expensive and complicated pressure molds having complementary interfitting members or the employment of water or air bags inside pressure chambers. This manner of building up pressure during curing of laminated articles containing a curable synthetic resin as a binder is aptly termed "stretch pressure" and has been found to greatly simplify the construction of laminated curved structures which are weatherproof and have high mechanical strength. Also the fiber structure of the fabric employed to produce the "stretch pressure" is not modified or distorted by mold pressure but the fibers or threads are aligned and straightened so as to develop their maximum tensile strength. It will be appreciated that mold pressure against the surface of a fabric during curing causes the individual threads or cords thereof to bend or crinkle about other threads at an angle thereto, for example, the woof threads are bent about the warp threads and vice versa by the tendency of the mold surface to force all of the threads, so far as possible, into a single plane. Such threads tend to straighten under stress during use of the finished article so as to take up the slack in the threads or fibers before resisting the applied stress. Thus the present invention not only eliminates the necessity of using pressure molds but produces a stronger structure.

The stretch pressure referred to is relatively easy to apply to substantially cylindrical surfaces having very little if any compound curvature. Such a substantially cylindrical surface is typified by such surfaces as those of airplane wings or the mid-portions of airplane fuselages. In constructing an airplane wing for example, a permanent internal frame structure for the wing, such as a rib and spar frame, is first built in accordance with known methods. A first layer of fabric is then applied to the frame by first stretching the same to near the tearing stress in a direction longitudinally of the axis of the wing and then wrapping the stretched fabric while under tension both longitudinally of the wing and circumferentially of the wing about the curved surface of the wing. A piece of material large enough to cover the entire wing is preferably employed, the longitudinal joint in the fabric preferably being made near or at the trailing edge of the wing. However, separate pieces of fabric for the upper and lower surfaces of the wing may be employed and even smaller sections when relatively large surfaces are being covered. The marginal portions of the fabric are preferably secured to the ribs or end pieces of the wing during the wrapping operation, for example by stapling. While improved results are accomplished by applying the fabric dry, it is preferred to wet the fabric with a resin solution prior to application to take advantage of the increased stretch thus made possible and the greater shrinkage obtained during drying. While the fabric thus applied is still wet or is retained in a wet condition by application of further amounts of resin solvent, thin lamina of non-woven fibrous material are applied over the fabric, for example in the manner shown in Fig. 2, the non-woven fibrous material being saturated with the resin solution when applied. Any desired thickness can thus be built up and an outer layer of woven fabric then applied in the same manner above described.

Figure 8:
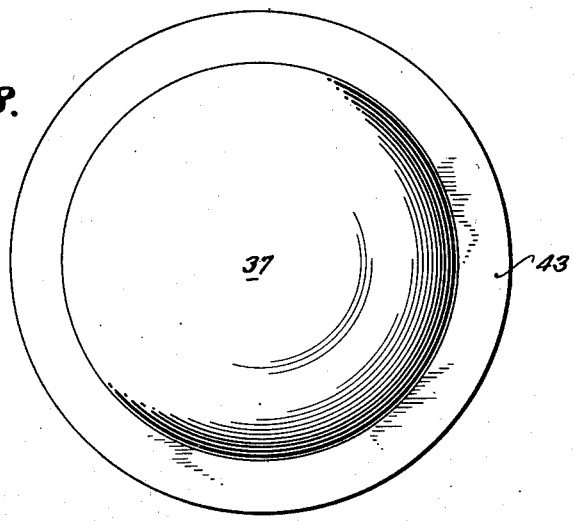
Fig. 8 is a plan view of one portion of the apparatus of Fig. 7.

Upon evaporation of the resin solvent such as water or organic solvent, the fabric layers, already under tension, dry and shrink so as to develop high internal pressure and curing of the resin results in a smooth compact laminated structure having high mechanical strength. This curing can be accomplished at low temperatures if a cold setting resin is employed and in the case of the thermo setting resins merely requires that the fabricated article be heated for example by being placed in a heated chamber or exposed to banks of infra red lamps; radiant heat from such lamps or the heated walls of a heating chamber being particularly effective. In the case of airplane wings, as just described, the tensioning of the fabric longitudinally of the wing prior to and during circumferential wrapping under tension, in conjunction with the stiffening effect of the non-woven fibrous material, substantially entirely prevents any pulling in of the wing covering between the ribs of the wing so that an accurate smooth airfoil surface is provided. Substantially the same manner of construction can be employed for the pontoon of Fig. 3 and the boat of Fig. 2 or on any other similar structure.

Where the compound curvature is large, special apparatus, for example, such as shown in Figs. 7 to 11 is desirable. In any of the structures of the present invention, any wrinkles or folds in the stretched fabric are to be avoided as such irregularities tend to release the stretch pressure. It has been found however, that fabrics in general can be subjected to a "deep drawing" operation if properly tensioned in two directions and the tension increased as the drawing progresses. Thus, as shown in Figs. 7 and 8, a fabric 36 may be drawn over a male mold so as to tension the same thereon without wrinkles. This is accomplished by first clamping the marginal portions between flat stretching rings 38 and 39 by means of clamps 41. By exerting relatively light pressure on the clamps 41 so that there is slight slippage of the cloth between the rings, the rings containing the fabric can be forced down over the top portion of the male mold 37 without wrinkling until the upper ring 38 is in position to be engaged by the clamps 42 which extend between the base 43 of the mold 36 and the ring 38. By slowly tightening the clamps 41 so as to increase the tension on the fabric while stretching the fabric by means of the clamps 42, the fabric may be made to fit the mold without wrinkles. While only two of each of the clamps 41 and 42 are shown, it is to be understood that they may be uniformly spaced around the mold and that other apparatus producing the same type of tension in the fabric may be employed.

In making laminated structures with the device of Fig. 7, it is preferred to first stretch a fabric layer over the mold as above described and then laminae of non-woven fibrous material are applied. Preferably each of these laminae are made up of pieces or sections shaped to abut each other with the joints in the various laminae offset with respect to each other. An outer layer of fabric is then stretched over the built up laminated structure. Preferably all of the various laminae including the fabric are applied while saturated with the resin solution and the built up structure allowed to dry on the mold to develop the stretch pressure above described. The resulting laminated structure is then preferably cured on the mold either cold or by the application of heat as above described depending upon the resin employed. It will be apparent that the mold illustrated may constitute an internal bracing structure or frame of the fabricated article so as to form a permanent part thereof. In such case the resin is employed as an adhesive to secure the laminated structure to the frame, where the mold is to be removed, it is treated to prevent adherence by the resin for example, by being covered with waxed paper or regenerated cellulose sheets, or in some cases merely waxing the surface of the mold is sufficient.

Figure 9:
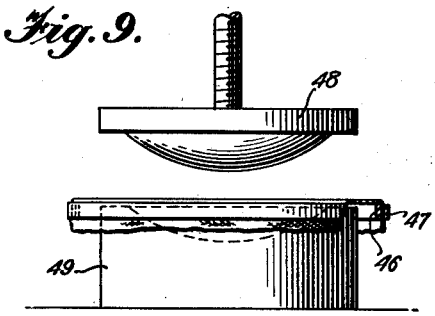
Fig. 9 is a view similar to Fig. 7 showing a portion of a modified apparatus.

In making various structures, other types of stretching apparatus has been found advantageous. For example, in Fig. 9 inner and outer wood or metal bands 46 and 47 respectively, operating similarly to large embroidery hoops may be used in conjunction with a male mold 48. The apparatus of Fig. 9 is particularly advantageous where the laminated article is made up entirely of flexible lamina such as cloth or layers of cloth alone or with intermediate layers of flexible felted fibrous material. All of the lamina may be saturated with the resin solution and gripped by the hoops 46 and 47 after being superimposed. The wet laminae are then supported across a hollow base 49 and the mold 48 forced thereagainst to stretch the lamina without wrinkling.

Figure 10:
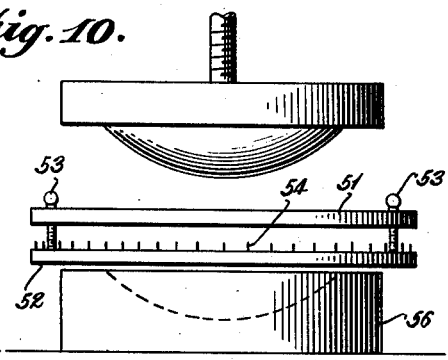
Fig. 10 is a view similar to Fig. 9 showing a further modified apparatus.

A similar apparatus is shown in Fig. 10, in which apparatus the superimposed laminae are gripped between flat rings 51 and 52 by means of screws or clamps 53. One of the rings may be provided with a plurality of pins 54 received in corresponding holes (not shown) in the other ring so as to prevent slipping of the laminated structure during stretching. The wet laminated structure is then supported on a hollow base 56 and a male mold forced downwardly to stretch and form the same.

Figure 11:
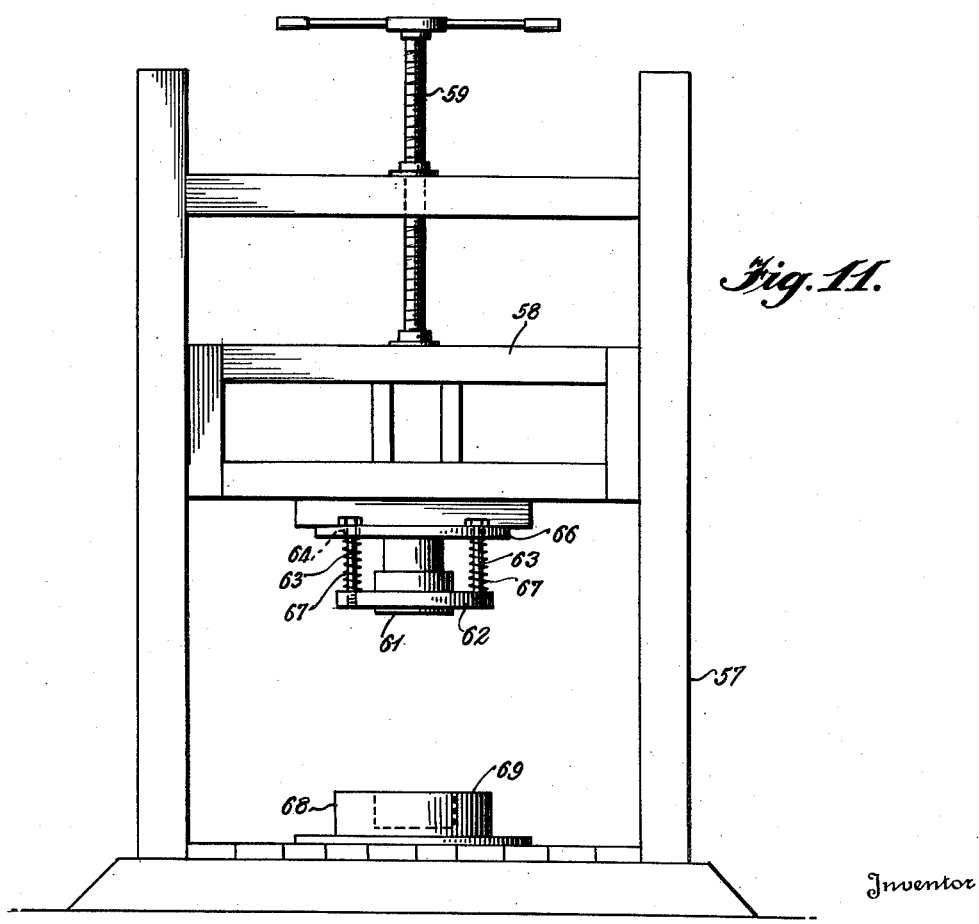
Fig. 11 is a view similar to Fig. 7 showing a still further modified apparatus.

The apparatus of Fig. 11 illustrates another method of holding the marginal edges of the wet laminated structure during stretching and forming. This figure shows a press having a frame 57 supporting a cross head 58 for vertical movement under control of the screw 59. The cross head has a male mold member 61 secured to its lower portion, the mold member being surrounded by a clamping ring 62 secured to guide plungers 63, slidable in apertures 64 in a guide plate 66 also secured to the cross head 58. Compression springs 67 surround the plungers 63 and resiliently urge the clamping ring 62 downwardly toward a base mold member 68. When a wet laminated structure similar to that described with reference to Figs. 9 and 10 is placed upon the upper surface 69 of the base member 68, and the crosshead 58 lowered under pressure, the marginal edges of the laminated structure are gripped between said surface 69 and the clamping ring 62 immediately after the mold member 61 engages the central portion of the laminated structure. Continued downward movement of the cross head 58 causes forming and stretching of the laminated structure, the springs 67 increasing the marginal clamping pressure and therefore the tension, on the laminated structure as the stretching proceeds.

It is apparent that a great many different types of structures, including boats, airplane structures, automobile bodies, etc., may be easily and rapidly constructed in accordance with the present invention. The present invention finds its chief utility in the construction of structures having curved surfaces, particularly those having compound curvature. It is also possible to build up tubular or other structures by saturating strips or webs of either woven fabric or non-woven fibrous material or both and winding the same upon suitable forms. The present invention is also applicable to the repair or renewal of existing structures as well as to the construction of new structures. Thus the laminated structures described herein can be applied over the surfaces of new or old boats, pontoons, etc. to prevent leaks and provide reinforcement, and the same is true of tanks or other storage vessels. The lamination can also be applied to houses and furnishings, refrigerators, etc. both for renewing old surfaces and in initial construction. The surface or frame being covered can be of substantially any material such as wood, metal, fabric, etc. For example, steel boats may in many instances be advantageously covered to protect the metal and add strength thereto. Although for most constructions the employment of both woven fabrics and felted fibrous materials in the laminated structure insures high tensile strength, and the desired balance between flexibility and stiffness, laminated structures of fibrous materials consisting of woven fabric alone may be produced in accordance with the present invention.

Instead of applying the various laminae while wet with an aqueous or other solvent solution of a soluble resin, laminae containing solid substantially solvent-free resin can be applied while the partially reacted resin is maintained in a fused or thermoplastic state. Thus a lamina such as fabric can be dipped in or sprayed with a solution of a suitable resin and the solvent allowed to evaporate to incorporate the resin into the fabric. Alternatively, a solvent-free resin while in fused or thermoplastic state can be spread or frictioned upon a fabric or other lamina or otherwise applied so as to be caused to penetrate into the body thereof. With felted fibrous materials, substantially the same procedures can be employed as with fabric. Also, suspensions of partially reacted resin can be admixed with the fiber stock prior to sheeting the same in order to provide sheets having the resin deposited upon the fibers or contained in the voids between the fibers.

By applying the various laminae while heated sufficiently to render the resin thermoplastic or liquid, the "stretch pressure" operations described above with reference to laminae saturated with a solution of resin can be carried out. Thus felted fibrous laminae can be made to conform to curved surfaces and fabric laminae containing a fused or heat liquefied resin can be employed in all of the "stretch pressure" operations described above. That is to say, the heat liquefied substantially solvent-free resins can be used instead of resin solutions during the stretching operations. Also, there are available on the market partially reacted thermosetting resins which are liquid even when solvent-free, and such resins suitably incorporated into the laminae are especially suitable for "stretch pressure" operations, as no solvent or heating is necessary during the stretching steps. Subsequent heating while the stretch pressure is maintained sets such resins to a solid substantially insoluble and infusible state. In some cases it is unnecessary to have the resin contained in the fabric in fused or liquid form during the stretching operations, in which case a dry fabric impregnated with a solid partially reacted resin can be stretched to apply pressure to and adhere to underlying laminae when the structure containing the resin is subsequently heated to first render the resin thermoplastic and then set it to the insoluble and infusible state.

It is apparent that an outer fabric can be stretched to apply pressure to a laminated or other structure during curing thereof irrespective of whether such fabric contains a resin in any form or whether the fabric is adhered to the structure. Thus a fabric covering can be stretched to apply pressure by any of the steps described in detail above and a layer of impervious and non-adherent material such as metal foil or "Cellophane" can be used between the fabric and the structure being cured. A cold curing resin can be employed as a binder for the structure, or a thermosetting resin can be used, in which case the structure can be heated, during or after stretching of the pressure creating fabric, to first render the resin thermoplastic and then cure the resin. The fabric can then be removed after the cure is complete. "Stretch pressure" operations employing a stretched outer fabric can also be employed for compacting laminated or other structures containing a thermoplastic resin. Heat can be applied either during the stretching operation or subsequent thereto while the stretch pressure is maintained, and the outer fabric can either contain the thermoplastic resin so as to become a part of the final structure or can be resin-free and be isolated from the final structure by an impervious layer as described above. In any case, the stretch pressure is preferably maintained until the resin has again cooled to form the final article. Thermoplastic resins are well known to the art and may be applied to or incorporated into the various laminae prior to fabrication in any known or suitable manner.

This application is a continuation-in-part of my copending application Serial No. 448,300, filed June 24, 1942, which in turn is a continuation-in-part of my application Serial No. 435,901, filed March 23, 1942.

While I have disclosed the preferred embodiments of my invention, it is understood that the details thereof may be varied within the scope of the following claims.

I claim as my invention:

1. The method of making a laminated structure, which comprises, superimposing at least one layer of fibrous material, over a form, while said layer is saturated and wet with a solution of a partially reacted synthetic resin which further reacts to a substantially insoluble and infusible state during curing, stretching a woven fabric over the outer surface of said fibrous material so as to build up an internal pressure on said layer prior to curing the resin therein, and curing said resin while maintaining said woven fabric in stretched condition during said curing to utilize the internal pressure created by said stretching to assist in the curing of said synthetic resin.

2. The process of fabricating laminated structures, which comprises, stretching a woven fabric over a form, applying at least one layer of a non-woven felted fibrous material to said fabric while said fabric and felted fibrous material are saturated and wet with a solution of a partially reacted soluble synthetic resin which further reacts to a substantially insoluble and infusible state during curing, stretching a woven fabric over the outer surface of said layer prior to curing the resin in said layer so as to build up an internal pressure on said layer, and curing said resin while maintaining said last mentioned woven fabric in stretched condition during said curing to utilize the internal pressure created by said stretching to assist in the curing of said synthetic resin.

3. The process of fabricating laminated structures, which comprises, stretching a woven fabric over a convex supporting structure, applying a plurality of layers of non-woven fibrous material to said fabric while said fabric and non-woven fibrous material are saturated and wet with a solution of a partially reacted soluble synthetic resin which further reacts to a substantially insoluble and infusible state during curing, stretching another layer of woven fabric over said layers of non-woven fibrous material prior to curing the resin in said non-woven fibrous material, said last mentioned fabric being saturated with said solution and drying and curing said structure while maintaining said other layer of woven fabric in stretched condition to produce an internal pressure in said laminated structure.

4. The process of fabricating laminated structures, which comprises, stretching a woven fabric over a convex form, applying at least one layer of a wood veneer to said fabric while said fabric and wood veneer are saturated and wet with a solution of a partially reacted soluble synthetic resin which further reacts to a substantially insoluble and infusible state during curing, clamping the marginal edges of a layer of a second woven fabric and stretching said second fabric over the layers on said form prior to curing the resin in said wood veneer and while said second fabric is saturated with said solution and said marginal edges are clamped to provide controlled slippage of said edges toward said form, increasing the resistance to said slippage during the latter stages of said stretching and drying and curing said structure on said form without external pressure while maintaining said second fabric in stretched condition to maintain said internal pressure.

5. The method of making a laminated structure, which comprises, superimposing, over a form, a plurality of layers of fibrous material impregnated with synthetic resin which fuses and then reacts to a substantially insoluble and infusible form when heated, stretching a woven fabric over the outer surface of said plurality of layers to apply an internal pressure on said layers, and thereafter subjecting said layers to a temperature sufficiently high to fuse and react said resin while maintaining said woven fabric in stretched condition during the fusing and reacting of said resin to maintain said internal pressure.

6. The method of making a laminated structure, which comprises, superimposing upon a convex form a plurality of layers of fibrous material impregnated with synthetic resin which fuses when heated, stretching a woven fabric over the outer surface of said plurality of layers to apply an internal pressure on said layers, thereafter subjecting said layers to a temperature sufficiently high to fuse said resin while maintaining said woven fabric in stretched condition during fusing of said resin to maintain said internal pressure, and allowing said resin to become solid while still under said internal pressure.

POWEL CROSLEY, III.

REFERENCES CITED

The following references are of record in the file of this patent:

UNITED STATES PATENTS

| Number | Name | Date |
|---|---|---|
| 2,203,501 | Menger | June 4, 1940 |
| 2,079,868 | Patch | May 11, 1937 |
| 2,015,806 | Menger | Oct. 1, 1935 |
| 1,976,257 | Harper | Oct. 9, 1934 |
| 1,106,193 | Deperdussin | Aug. 4, 1914 |
| 1,338,564 | Elmendorf | Apr. 27, 1920 |
| 1,394,726 | Gilmore | Oct. 25, 1921 |
| 1,425,113 | Loughead | Aug. 8, 1922 |
| 2,019,834 | Vierling | Nov. 5, 1935 |

FOREIGN PATENTS

| Number | Country | Date |
|---|---|---|
| 479,839 | British | Feb. 8, 1938 |